US012412971B2

(12) United States Patent
Yukimasa

(10) Patent No.: US 12,412,971 B2
(45) Date of Patent: Sep. 9, 2025

(54) WIRELESS COMMUNICATION APPARATUS

(71) Applicant: CANON KABUSHIKI KAISHA, Tokyo (JP)

(72) Inventor: Koji Yukimasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 18/312,504

(22) Filed: May 4, 2023

(65) Prior Publication Data

US 2023/0378627 A1 Nov. 23, 2023

(30) Foreign Application Priority Data

May 18, 2022 (JP) ................................ 2022-081887

(51) Int. Cl.

*H01P 5/18* (2006.01)
*H01P 1/26* (2006.01)
*H01P 5/00* (2006.01)

(52) U.S. Cl.

CPC . *H01P 5/00* (2013.01); *H01P 1/26* (2013.01)

(58) Field of Classification Search

CPC ............... H01P 5/00; H01P 1/26; H01P 5/187

See application file for complete search history.

(56) References Cited

U.S. PATENT DOCUMENTS 11,502,719 B2 * 11/2022 Asai .......................... H04L 5/14
2018/0198490 A1 * 7/2018 Yukimasa ............ H04B 7/0865
2019/0245575 A1 * 8/2019 Yukimasa ................ H04B 5/22
2020/0127703 A1 * 4/2020 Yukimasa ................ A61B 6/56
2022/0131566 A1 * 4/2022 Morita ................. H04B 1/1607

FOREIGN PATENT DOCUMENTS

JP 2009268022 A 11/2009

* cited by examiner

*Primary Examiner* — Angelica Perez

(74) *Attorney, Agent, or Firm* — Canon U.S.A., Inc. IP Division

(57) ABSTRACT

In a wireless communication apparatus including a communication coupler and a circuit, a first substrate and a second substrate face each other in a longitudinal direction of the communication coupler. The first substrate includes a first signal line, a second signal line, a third signal line, a distributor, and a terminating resistor. At the distributor, the first signal line branches into the second signal line and the third signal line. The second signal line is terminated at the terminating resistor at an end of the first substrate. The second substrate includes a fourth signal line. At least one of the third signal line or the connection signal line is configured such that a phase of a signal at the facing portion of the second signal line and a phase of a signal at the facing portion of the fourth signal line are continuous.

3 Claims, 4 Drawing Sheets

WIRELESS COMMUNICATION APPARATUS

BACKGROUND

Field of the Disclosure

The present disclosure relates to wireless communication techniques.

Description of the Related Art

Wireless communication systems that perform communications by electromagnetic coupling have been developed in recent years. Such a wireless communication system communicates non-modulated baseband signals, which provides high-speed, less-delayed communications with simplified circuitry. For example, Japanese Patent Application Laid-Open No. 2009-268022 discusses a technique of arranging two slot antennas opposed to each other in close proximity, and transferring baseband signals in a non-contact manner.

In wireless communication systems that perform communications between communication couplers disposed on their respective substrates, the length of each communication coupler is restricted to the size of the corresponding substrate. To solve this issue, by connecting a plurality of substrates with a coaxial cable or the like, a communication coupler can be configured without being restricted to the size of a substrate. However, the cable connecting these substrates can cause a signal to be delayed, causing splits at rising and falling edges of a reception signal waveform.

SUMMARY

Aspects of the present disclosure are directed to providing high-speed wireless communications by reducing splits at rising and falling edges of reception signal waveforms.

According to an aspect of the present disclosure, a wireless communication apparatus includes a communication coupler including a plurality of substrates including a first substrate and a second substrate, and a connection signal line, and a circuit configured to transmit or receive a signal to or from the communication coupler. The first substrate and the second substrate are opposed to each other in a longitudinal direction of the communication coupler. The first substrate includes a first signal line, a second signal line, a third signal line, a distributor, and a terminating resistor. At the distributor, the first signal line branches into the second signal line and the third signal line. The second signal line is terminated at the terminating resistor at an end of the first substrate. The second substrate includes a fourth signal line. The connection signal line connects the third signal line and the fourth signal line. A facing portion of the second signal line and a facing portion of the fourth signal line are opposed to each other, and at least one of the third signal line or the connection signal line is configured such that a phase of a signal at the facing portion of the second signal line and a phase of a signal at the facing portion of the fourth signal line are continuous.

Further features of the present disclosure will become apparent from the following description of embodiments with reference to the attached drawings.

DESCRIPTION OF THE EMBODIMENTS

Hereinafter, an embodiment will be described with reference to the accompanying drawings. The embodiment described below do not limit the present disclosure. Not all combinations of features described in the embodiment are used as means for solution in the present disclosure.

Figure 1A:
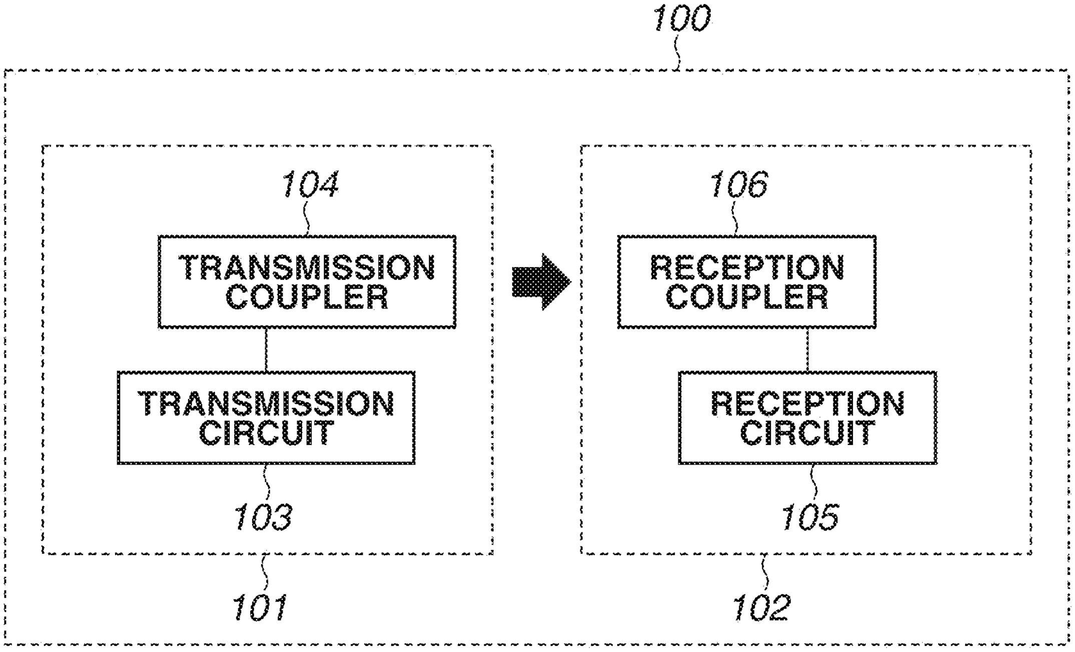
FIG. 1A illustrates the configuration of a wireless communication system according to conventional art.
Figure 1B:
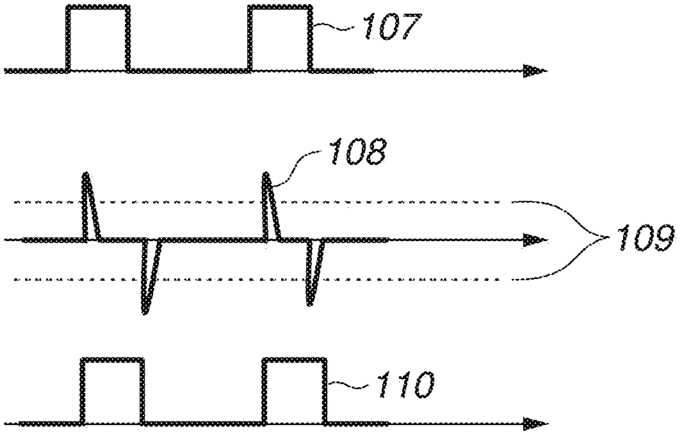
FIG. 1B illustrates examples of signals that are transmitted and received.

Issues with the conventional wireless communication technology will be described first. A wireless communication system 100 illustrated in FIG. 1A includes a transmission device 101 and a reception device 102. The transmission device 101 includes a transmission circuit 103 and a transmission coupler 104. The reception device 102 includes a reception circuit 105 and a reception coupler 106. FIG. 1B illustrates an example of signals that are transmitted and received. The transmission coupler 104 in the transmission device 101 transmits a digital signal 107 without modulation, and the reception coupler 106 in the reception device 102 receives a reception signal 180 as a differentiated signal. The reception device 102 restores the reception signal 108 to a signal 110 based on the reception signal 108 and thresholds 109 of a comparator in the reception circuit 105.

Figure 2A:
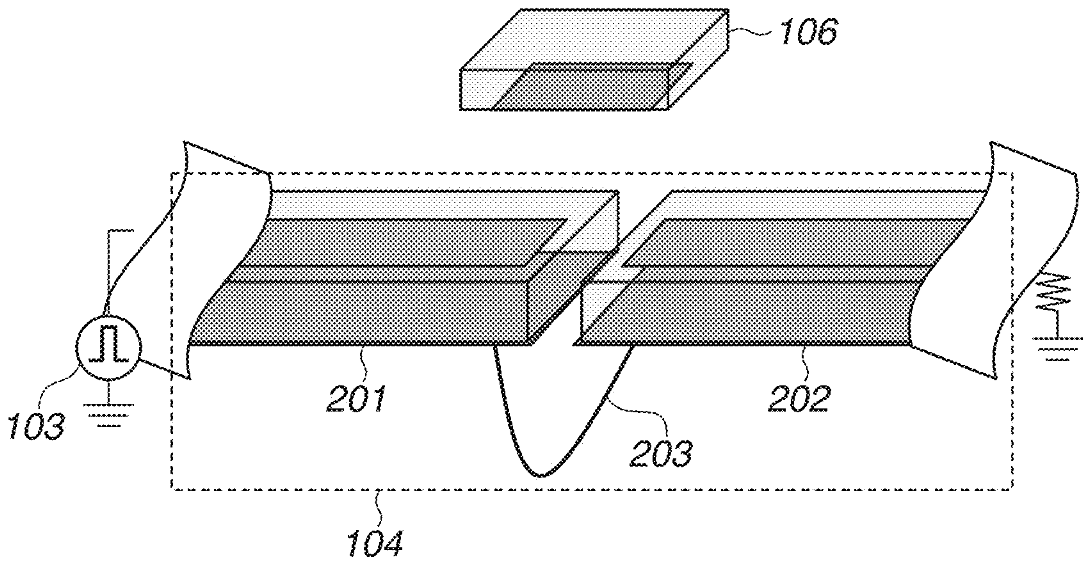
FIG. 2A illustrates the configuration that lengthens a communication coupler.
Figure 2B:
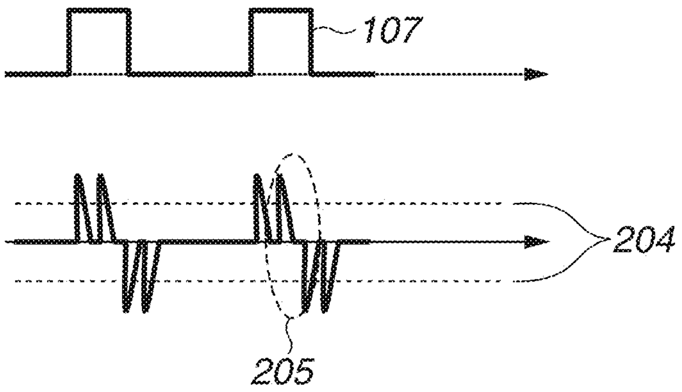
FIG. 2B illustrates signal waveforms, according to the conventional art.

Suppose that communication is being performed while a short sized coupler is being moved in the longitudinal direction of a long sized coupler in the wireless communication system that includes the short sized coupler and the long sized coupler. When the long sized coupler is configured on a substrate, the length of the long sized coupler is restricted to the size of the substrate. However, the long sized coupler can be configured on a plurality of substrates that are connected to each other with a coaxial cable (connection signal line) or the like, without being restricted to the size of a substrate. FIG. 2A illustrates a configuration example in a case of extending the length of the long sized coupler using a coaxial cable. A substrate 201 and a substrate 202 are connected to each other with a coaxial cable 203. Such a configuration of extending the length of the long sized coupler with the coaxial cable 203 can delay a signal due to influence of the coaxial cable 203. This signal delay causes splits illustrated in FIG. 2B at rising and falling edges of a reception signal waveform. These splits at the rising and falling edges of the reception signal waveform can reduce the amplitudes at the rising and falling edges, reaching short of thresholds 204 of the comparator. In addition, an interval 205 between a rising edge and the next falling edge will shorten at higher communication speeds. This will cause the amplitudes at the next rising and falling edges to decrease, creating a communication error.

A wireless communication system that can reduce splits at rising and falling edges of a reception signal waveform even with an extended length of the long sized coupler, according to the present embodiment, will now be described.

Figure 3:
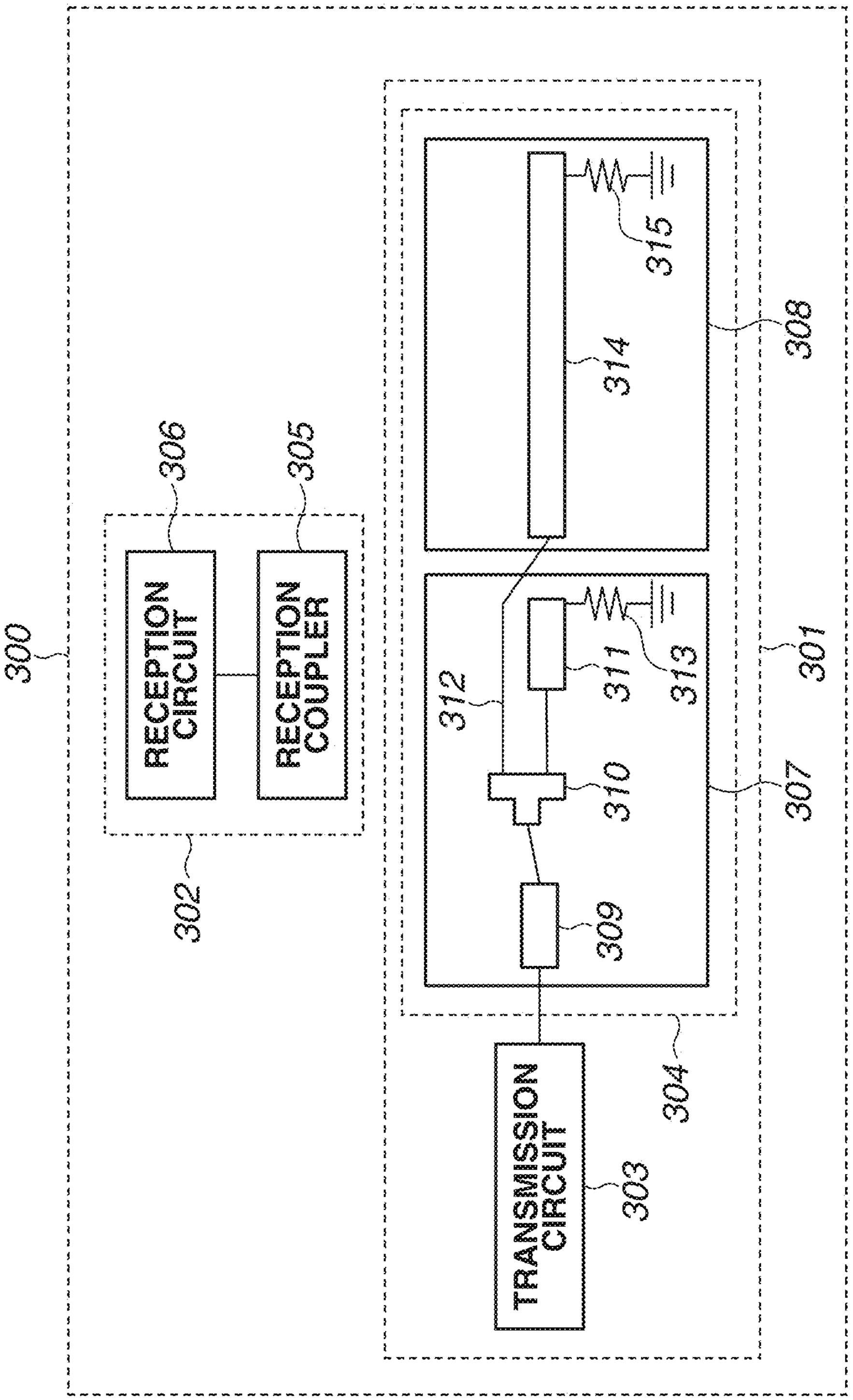
FIG. 3 illustrates a wireless communication system according to an embodiment.

FIG. 3 illustrates a configuration of the wireless communication system 300 according to the present embodiment. A wireless communication system 300 includes a wireless communication apparatus 301 (transmission device) and a wireless communication apparatus 302 (reception device). The wireless communication apparatus 301 includes a transmission circuit 303 and a transmission coupler 304, and the wireless communication apparatus 302 includes a reception circuit 306 and a reception coupler 305. Wireless communication in the wireless communication system 300 is performed by transmitting a signal generated in the transmission circuit 303 from the transmission coupler 304, receiving the signal by the reception coupler 305, and generating a signal waveform at the reception circuit 306. The transmission coupler 304 includes a transmission coupler 307 and a transmission coupler 308.

While the transmission coupler 304 includes these two transmission couplers 307 and 308, three or more transmission couplers may be included.

The transmission coupler 307 includes a signal line 309, a distributor 310, a signal line 311, a coaxial cable 312, and a terminating resistor 313 on the signal line 311. The signal line 309 is connected to the distributor 310, and the distributor 310 is connected to one end of the signal line 311 and one end of the coaxial cable 312. The other end of the signal line 311 is terminated at the terminating resistor 313 at an end of the transmission coupler 307.

The transmission coupler 308 includes a signal line 314 and a terminating resistor 315 on the signal line 314. The other end of the coaxial cable 312 connected to the distributor 310 in the transmission coupler 307 is connected to one end of the signal line 314 in the transmission coupler 308. The other end of the signal line 311 and the one end of the signal line 314 face each other.

The signal generated in the transmission circuit 303 is transmitted to the transmission coupler 307 and is distributed by the distributor 310. One distributed signal travels on the signal line 311, and is terminated at the terminating resistor 313. The other distributed signal travels on the coaxial cable 312 and the signal line 314, and is terminated at the terminating resistor 315. The length and the type of the coaxial cable 312 are changed such that the phases of the one distributed signal and the other distributed signal are continuous at the end of the signal line 314 facing the signal line 311 and the end of the signal line 311 facing the signal line 314. The length of the signal line 311 may be changed instead.

Figure 4:
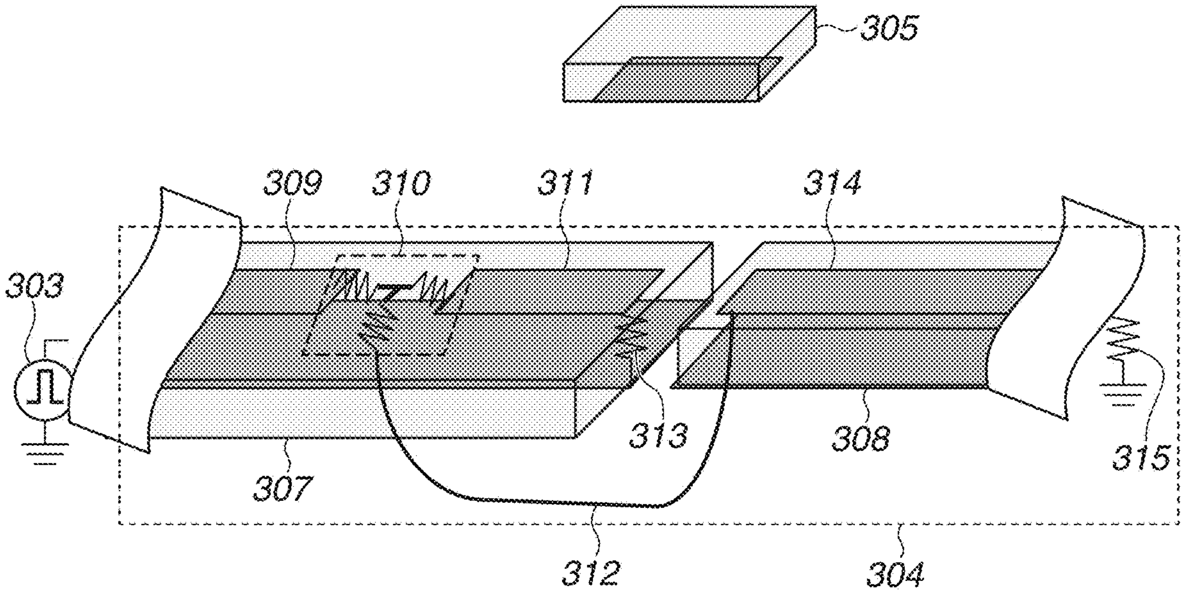
FIG. 4 illustrates the configuration of a communication coupler according to the present embodiment.

FIG. 4 illustrates a stereoscopic configuration example of a communication coupler in a concrete manner. The transmission coupler 304 and the reception coupler 305 are arranged to face each other in close proximity. If the reception coupler 305 travels in the longitudinal direction of the transmission coupler 304, it is desirable that the transmission coupler 307 and the transmission coupler 308 are arranged substantially in the longitudinal direction.

In the present embodiment, single-ended signal communication is performed, but a differential signal can be used. Differential signal communication is performed with a transmission coupler and a reception coupler each provided with two signal lines. In the present embodiment, a communication coupler provided with a terminating resistor is a transmission coupler, and a communication coupler without a terminating resistor is a reception coupler, but the combination of a communication coupler without a terminating resistor as a transmission coupler and a communication coupler with a terminating resistor as a reception coupler may be used.

The configuration according to the present embodiment of the present disclosure reduces splits at rising and falling edges of a reception signal waveform, providing high-speed wireless communications.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-081887, filed May 18, 2022, which is hereby incorporated by reference herein in its entirety.

What is claimed is:

1. A wireless communication apparatus comprising:

a communication coupler including a plurality of substrates including a first substrate and a second substrate, and a connection signal line; and a circuit configured to transmit or receive a signal to or from the communication coupler, wherein the first substrate and the second substrate are opposed to each other in a longitudinal direction of the communication coupler, wherein the first substrate includes a first signal line, a second signal line, a third signal line, a distributor, and a terminating resistor, wherein at the distributor, the first signal line branches into the second signal line and the third signal line, wherein the second signal line is terminated at the terminating resistor at an end of the first substrate, wherein the second substrate includes a fourth signal line, wherein the connection signal line connects the third signal line and the fourth signal line, and wherein a facing portion of the second signal line and a facing portion of the fourth signal line are opposed to each other, and at least one of the third signal line or the connection signal line is configured such that a phase of a signal at the facing portion of the second signal line and a phase of a signal at the facing portion of the fourth signal line are continuous.

2. The wireless communication apparatus according to claim 1, wherein the communication coupler is a transmission coupler configured to transmit a signal to a reception coupler included in another communication apparatus, and wherein the circuit generates the signal, and transmits the generated signal to the transmission coupler.

3. The wireless communication apparatus according to claim 1, wherein the communication coupler is a reception coupler configured to receive a signal from a transmission coupler included in another communication apparatus, and wherein the circuit forms a signal waveform based on the signal received by the reception coupler.

* * * * *